June 1, 1954

R. E. YAEGER 2,680,160

BIAS CIRCUIT FOR TRANSISTOR AMPLIFIERS

Filed Sept. 15, 1951

2 Sheets-Sheet 1

INVENTOR
R. E. YAEGER
BY
K. A. Burgess
ATTORNEY

June 1, 1954 R. E. YAEGER 2,680,160

BIAS CIRCUIT FOR TRANSISTOR AMPLIFIERS

Filed Sept. 15, 1951

2 Sheets-Sheet 2

INVENTOR
R. E. YAEGER

BY H. A. Burgess

ATTORNEY

Patented June 1, 1954

2,680,160

UNITED STATES PATENT OFFICE 2,680,160

BIAS CIRCUIT FOR TRANSISTOR AMPLIFIERS

Robert E. Yaeger, Califon, N. J., assignor to Bell Telephone Laboratories, Incorporated, New York, N. Y., a corporation of New York Application September 15, 1951, Serial No. 246,823

3 Claims. (Cl. 179—171)

The present invention relates to bias circuits for transistors.

Certain known bias methods suitable for small signal, low power operation have been found inadequate in practice for large signal, high dissipation applications. This was particularly the case where variability of operation due to temperature changes in the unit had to be dealt with.

Certain types of transistors having a current amplification factor less than unity are well suited to high power dissipation uses and because of the less-than-unity amplification factor are inherently stable with wide differences in value of connected impedances. When these transistors are driven for maximum output however, any shift in operating point, due to temperature change or other cause, may produce a further shift in the same direction, thus endangering the unit from overheating, unless the circuit is stabilized against such shifts.

A general object of this invention is to bias a transistor for high or maximum power dissipation and at the same time stabilize its operating point.

Another object is to provide a stably adjusted amplifier utilizing transistors whose base current varies widely percentagewise with temperature, or from one transistor unit to another.

The invention will be disclosed for illustration as applied to an NPN transistor although it may equally well be applied to any transistor having transmission characteristics generally similar to those of an NPN transistor or to transistors generally having current gain factors approaching but less than unity.

The NPN transistor is disclosed in an article by R. L. Wallace, Jr., and W. J. Pietenpol, published in the Bell System Technical Journal for July 1951, volume XXX, No. 3, pages 530-563, entitled "Some Circuit Properties and Applications of N-P-N Transistors." As there disclosed, such a transistor may comprise a body of semiconductive material such as germanium having its major part comprised of N-type material and a small central zone of P-type material, with a base connection made to the latter portion and an emitter and a collector connected respectively to two N-type portions. As in the case of other types of transistors, this type can be connected into a circuit having the configuration of grounded base, grounded emitter or grounded collector as one may choose.

The invention not only stabilizes the operating point of a transistor when driven toward maximum power output but, as one feature, achieves this by use of a single bias battery, or other source of steady voltage, in a novel manner. Common source bias circuits in the past, so far as known, relied in part upon the flow of base current through a resistor to develop a bias voltage. This is not practicable in the case of an NPN transistor, however, since the base current is too small and too variable percentagewise. In fact the base current may change direction from unit to unit.

Since the collector current is very nearly equal to the emitter current, a resistor can be included in the emitter lead to control the direct-current voltage on the emitter, and the base terminal can then be connected to a suitable point in a potentiometer resistance to bring the voltage on the base to closely the same value as the voltage on the emitter. Advantage is taken of the fact that whatever resistance is necessary can be included in the portion of the potentiometer resistance that is connected to the base electrode without causing direct-current instability, since the gain factor is less than unity. The resistance values can then be made such as to stabilize the emitter current at a given value. This also stabilizes the collector current at very nearly the same value.

The novel features of the invention will appear more fully in connection with the following detailed description and accompanying drawings.

In the drawings Fig. 1 shows graphs to be referred to in the description;

In the description to follow, reference will be made to certain quantities which have been developed in the literature of transistors as an aid to understanding transistor behavior. In an article entitled "Some Circuit Aspects of the Transistor" by R. M. Ryder and R. J. Kircher, published in the Bell System Technical Journal for July 1949, it was pointed out that the transistor can be analyzed in terms of four resistances which can be determined for any given transistor directly from the static characteristic curves. These four resistances are: $r_e$, which is the emitter resistance; $r_b$ which is the base resistance; $r_c$ which is the collector resistance; and $r_m$ which is the integral resistance of the fictitious internal generator corresponding to the familiar $\mu e_g$ of the vacuum tube. From the measured values of these quantities, another quantity, $\alpha$, the current amplification factor of the transistor can be found by the equation $$\alpha=\frac{r_m+r_b}{r_c+r_b}$$

It is also convenient to refer to certain currents: $I_e$, the emitter current; $I_b$, the base current; and $I_c$, the collector current. Corresponding nomenclature is used for the various voltages. The term $I_{co}$ is the collector current for any particular value of collector voltage when the emitter current is zero.

Figure 1:
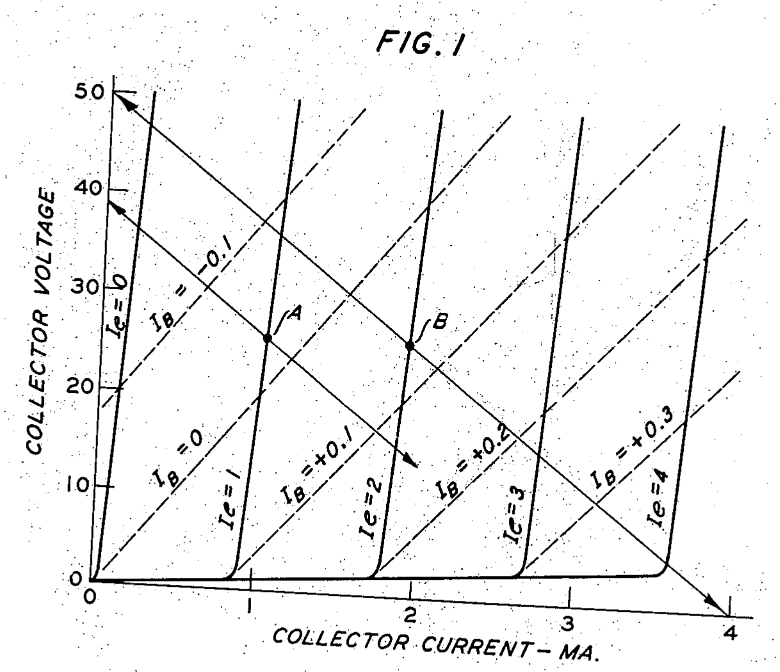

In Fig. 1 solid line characteristics are shown for collector voltage versus collector current with various constant emitter currents, and their slopes in the operating region represent the $r_c$ of the transistor. The graphs are somewhat idealized for the sake of illustration and the $r_c$ slope is exaggerated for reasons of clarity, but the principles of operation can be well illustrated by use of these graphs. A value of $\alpha$ equal to 0.9 and a value of $r_c$ equal to 200,000 ohms have been assumed. The slopes in the operating region are constant for all values of emitter current, an ideal condition for an essentially constant value of $\alpha$. Fig. 1 also includes a set of dotted lines representing constant base current for the collector voltage-current curves that are plotted. These lines are derived by using the fundamental criterion that the algebraic sum of base, emitter and collector currents must equal zero. One of these lines passes through those points at which the emitter current and collector current are equal ($I_b=0$). Another is shown as passing through points in which the emitter current is 100 microamperes less than the collector current, represented by $I_b=+100$ microamperes. The other constant $I_b$ curves can be plotted in the same manner. Curve $I_e=0$ is the locus of all values of $I_{co}$.

If in constant base current operation a desired operating point of 20 volts at 1 milliampere $I_c$ is assumed, it is readily seen from Fig. 1 that a base current $I_b=0$ is required. At this voltage the $I_{co}$ is equal to 100 microamperes. Assume now that a temperature increase causes a change in $I_{co}$ from 100 microamperes to 200 microamperes. The entire family of $I_e$ curves moves 100 microamperes to the right, the $I_e=2$ milliamperes curve passing through point $I_c=2$ milliamperes instead of $I_c=1.9$ milliamperes at 20 volts. A new family of constant $I_b$ curves would result, the $I_b=0$ curve passing through $I_c=2$ milliamperes at 20 volts instead of at $I_c=1$ milliampere. The result is, of course, that the operating point has changed from 20 volts at 1 milliampere to 20 volts at 2 milliamperes. This assumes that constant voltage was maintained on the collector. Had material resistance in the direct current feed path been used, a corresponding reduction of operating voltage would have resulted in a shift along the direct-current load line. In practice it is found that changes in $I_{co}$ of as much as 10 to 1 may be met with in the operational temperature range.

Figure 2:
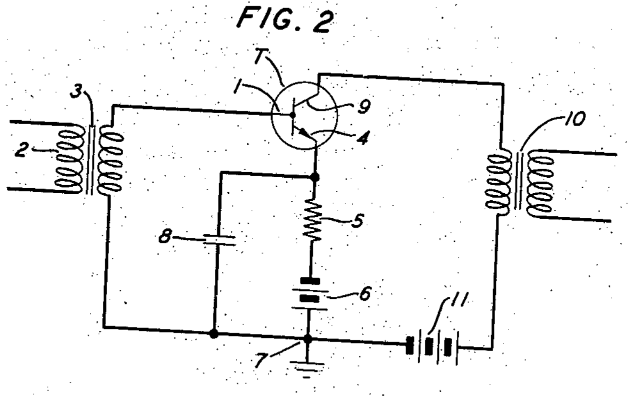
Fig. 2 is a simplified schematic circuit diagram of one form of biasing circuit according to the invention, using two batteries.
Figure 3:
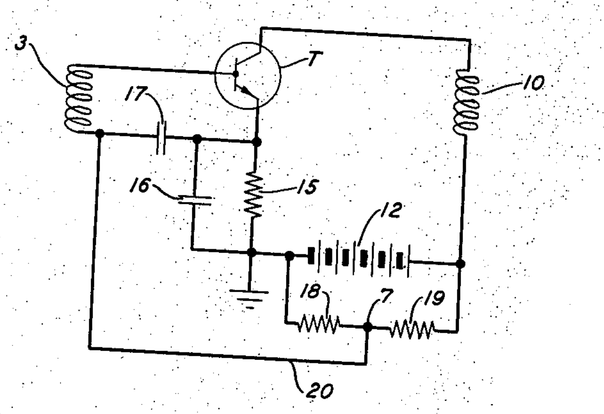
Fig. 3 is an alternative form of biasing circuit according to the invention using a single battery.
Figure 4:
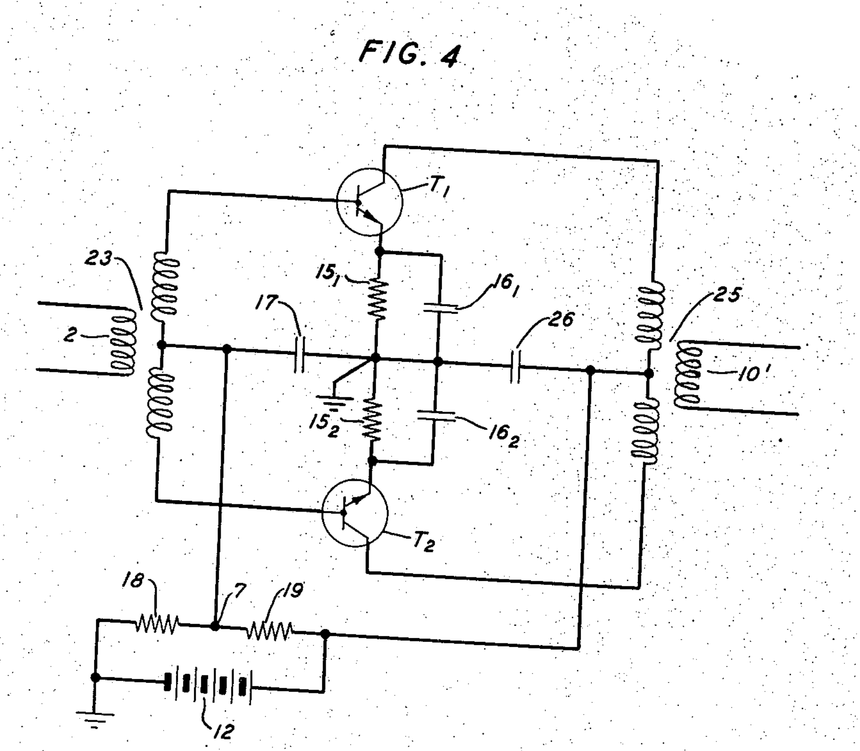
Fig. 4 is a circuit diagram of two of the Fig. 3-type circuits connected in push-pull relation.

In the circuit Figures 2, 3 and 4 only grounded emitter circuit configurations are represented since it is found that this configuration is best suited for high gain-high power output.

According to Fig. 2, the transistor T, assumed as illustrated to be an NPN type such as described in the Wallace-Pietenpol article, has its base electrode 1 connected to a signal input circuit 2 by way of an input transformer 3. The base electrode is connected to a reference potential point 7 or to ground by a direct current circuit having a suitably low resistance as to not materially influence or participate in establishing the resulting bias voltage between the base and emitter. The emitter 4 is connected through a resistance 5 and bias battery 6 to ground at reference potential point 7 for direct current and is connected to point 7 and ground for currents of signal frequency by means of condenser 8. Collector 9 is connected through an output signal coupling transformer 10 to bias battery 11. For an NPN type transistor, battery 6 has its negative pole connected to the emitter and battery 11 has its positive pole connected to the collector. In the type of transistor assumed, the collector current is very nearly equal to the emitter current, the base current being very small in comparison to either. In a typical example, the battery 6 and resistance 5 may be of such value as to provide a bias potential on the emitter differing by a small fraction of a volt from the base voltage. If this voltage between the emitter and base is held to a value small compared with the emitter bias battery 6, a constant emitter current through the emitter resistance 5 is maintained. In other words, the emitter current tends to be self-regulating. If $I_e$ tends to increase over the value of $$\frac{V_6}{R_5}$$

the emitter voltage becomes more positive with respect to the base, tending to reduce current flow into the base. This change in turn tends to reduce the emitter current by the relationship $$\Delta I_e=\frac{1}{1-\alpha}\Delta I_b$$

Thus, whether a negative, positive or zero base current is required, the emitter current is held essentially constant.

As an example, the collector operating current may be of the order of 1 to 2 milliamperes and the current $I_{co}$ of the order of 10 to 100 microamperes. With the emitter current held substantially constant, a large percentage change in $I_{co}$ will have very little effect on the collector current and a substantially constant operating point with respect to the collector current can be maintained.

Referring to Fig. 3, the single battery 12 supplies bias voltages for both the collector and emitter. The collector circuit is essentially the same as in Fig. 2. The battery 12 is shunted by potentiometer resistors 18 and 19 and the base, instead of being at direct-current ground in this case is connected by wire 20 to reference potential point 7 between resistors 18 and 19 so that the base has a positive bias. The base is bypassed to ground for the signal by condensers 17 and 16 and the emitter is bypassed to ground by the signal condenser 16. The value of the resistance 15 must be such that the IR drop across it is very nearly equal to the voltage across resistor 18 that is applied to the base. In other words as in the case of Fig. 2, the difference between the emitter voltage and the base voltage must be small compared to the emitter bias voltage supplied from across resistor 15. In one example, in a circuit that was used for high gain-high power output, the difference between emitter voltage and base voltage was about half a volt. The voltage across resistor 15 was six to ten times as much. The circuit was operated to give class A amplification, the direct-current dissipation was 50 milliwatts and the signal output was about 25 milliwatts.

In order to secure as high signal power as this, it was necessary to operate the transistor about the point B of Fig. 1 where $I_e$ was about 2 milliamperes and to swing the collector voltage for peak signal values between about 50 volts and zero, corresponding to a collector current variation between almost zero and 4 milliamperes. For illustration, if the transistor had been operated about the point A, the direct-current power dissipation would have been 25 milliwatts and the efficiency would have been only about half as great as in the previous case because for class A operation, the peak signal variation would have been confined to the collector voltage range of about 12½ to about 37½ corresponding to a collector current variation of nearly 0 to 2 milliamperes.

Referring again to the circuit of Fig. 3, if the base current is small compared with the current in the divider 18 and 19, the base current is held constant by the divider at a value $$E_{\text{base}}=E\frac{R_{18}}{R_{18}+R_{19}}$$

where E is the battery voltage. This voltage tends to drive a base current and hence an emitter current until the base and emitter voltage are almost equal. At this point the emitter current is determined by $$I_e=\frac{E_{\text{base}}}{R_{15}}=E\frac{R_{18}}{R_{15}(R_{18}+R_{19})}$$

As with the circuit of Fig. 2, the emitter current is held constant, the result being that the collector operating point is only slightly dependent on the temperature or unit-to-unit variation of $I_{co}$.

Referring to Fig. 4, the two transistors T1 and T2 are connected back to back to provide for push-pull amplification between input circuit 2 and output circuit 10'. The two base electrodes are connected respectively to opposite ends of the divided secondary winding of input coil 23 and two collectors are similarly connected respectively to opposite ends of the divided primary windings of output transformer 25. The similarity of the biasing arrangement to that of Fig. 3 may be seen from the use of corresponding numerals to indicate corresponding parts. This circuit may be driven to operate as class A amplifier or as partly class A and partly class B amplifier. If the circuit is operated partly class A and partly class B, the size of condensers $16_1$ and $16_2$ should be large enough to remain charged during the periods of time in which class A signal swing is exceeded, and the current interrupted. Where the current is interrupted for a large part of the time, these condensers may be removed. In this case it is advisable to use small bias resistors for $15_1$ and $15_2$ to minimize loss in gain due to degenerative feedback.

The invention disclosed is a great improvement over prior circuits utilizing currents to one or more electrodes to determine the resulting bias potential between emitter and base in that the base current $I_b$ does not appreciably enter into setting this potential. The base current $I_b$ varies so widely percentagewise with temperature in the NPN transistor, or between different transistor units, that any circuit utilizing the $I_b$ drop through a resistance to participate in determining the resulting bias is likely to affect adversely the efficiency and stability of the amplifier. The invention is of great utility where the power generating capacity of the NPN transistor is needed and it is desired to locate battery 12 at a remote point and supply the direct current power over a wire or wires, and at the same time provide two suitable bias voltages for two of the transistor electrodes.

Each of the circuits that has been illustrated for practicing the present invention permits maximum power dissipation of the unit up to the highest margin of safety of the unit itself, and permits constant operating characteristics not only during the warm-up period when the temperature of the transistor changes widely, but under all operating conditions, changes of load, changes of transistor unit, and other conditions which would materially change the value $I_{co}$ except for the self-regulating action of the biasing circuits provided by the invention. While the invention has been described in connection with an NPN transistor, it is applicable also to other types of transistors including even those point contact types which have a current gain factor less than unity. The NPN transistor is sometimes known as a junction transistor. Junction transistors can also be of the PNP type and their use in the circuits illustrated would merely require the reversal of the polarities of the batteries. When reference is made in the claims or elsewhere to a transistor having characteristics similar to those of the NPN, a current gain approaching but less than unity is the quantity of chief significance, another factor being large power carrying ability.

The circuits described herein are capable of various modifications within the spirit and scope of the invention and are to be taken as illustrative rather than limiting. While amplifiers are disclosed having separate input and output circuits, it will be obvious that the input can be taken from the output and the circuit be made self-oscillating.

What is claimed is:

1. A biasing circuit for a transistor having a body of semiconductive material and base, emitter, and collector terminal connections made thereto, said transistor characterized by a current gain factor which is slightly less than unity, said circuit comprising a single prime source of substantially constant direct-current biasing voltage, a potentiometer resistance connected across said prime source and having a magnitude to draw a current from said source which is so large relative to current in said base as to make biasing potentials applied to said base substantially independent of variations in said base current, said source and said potentiometer resistance comprising means for biasing said collector with respect to ground, means comprising a portion of said potentiometer resistance for biasing said base with respect to ground, an input coupling for signal waves included between the base and ground, an output coupling to the collector for signal waves, said emitter being grounded for signal frequency waves, and a resistor connected between said emitter and ground of sufficiently high value to hold the emitter direct current substantially constant in the presence of collector current variations that are slow in comparison with the lowest signal frequency.

2. A biasing circuit for a transistor possessing transmission characteristics similar to those of an NPN transistor for waves in an operating frequency range, base, emitter, and collector terminals therefor, a single prime source of direct-current voltage, a first resistor connected across said source, said first resistor having a magnitude to draw a current from said source which is so large relative to current in said base as to make biasing potentials applied to said base substantially independent of variations in said base current, a bias resistor connected between said emitter and one terminal of said source and bypassed for currents in said frequency range, an output coupling for said waves included between said collector and the other terminal of said source, and an input coupling for said waves connected between said base and emitter for said waves and connected between said base and a point between the ends of said first resistor for direct current, the connection to said first resistor being at a voltage point very nearly equal to the emitter voltage and such as to bring the normal base voltage to within a small difference from the normal emitter voltage, which difference is but a small fraction of the direct current voltage generated across said bias resistor whereby the circuit is effectively stabilized against slow fluctuations of emitter current.

3. A circuit according to claim 2 in which two of said transistors are connected back to back in a push-pull circuit configuration for said waves, divided input and output circuits for said two bases and said two collectors, respectively, individual bias resistors for said two emitters, a single lead from a terminal of said prime source to the common branch of said divided output circuit for biasing said collectors, and a single lead from said point on said first resistor to the common branch of said divided input circuit for biasing said two bases.

References Cited in the file of this patent

UNITED STATES PATENTS

| Number | Name | Date |
|---|---|---|
| 2,531,076 | Moore | Nov. 21, 1950 |
| 2,541,322 | Barney | Feb. 13, 1951 |
| 2,570,978 | Pfann | Oct. 9, 1951 |
| 2,595,496 | Webster | May 6, 1952 |
| 2,647,958 | Barney | Aug. 4, 1953 |
| 2,652,460 | Wallace | Sept. 15, 1953 |